Sept. 8, 1942.  N. CHAYES  2,295,201
REMOVABLE DENTURE
Filed Feb. 5, 1941
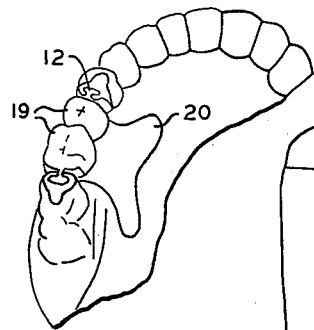
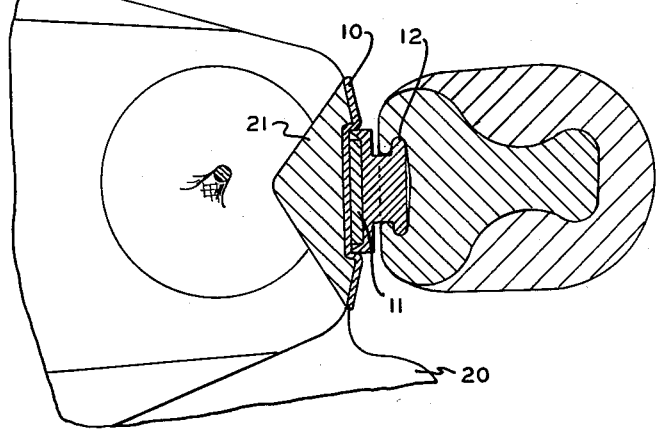
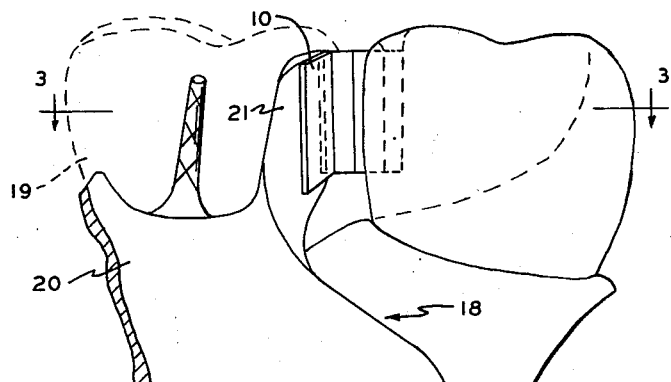
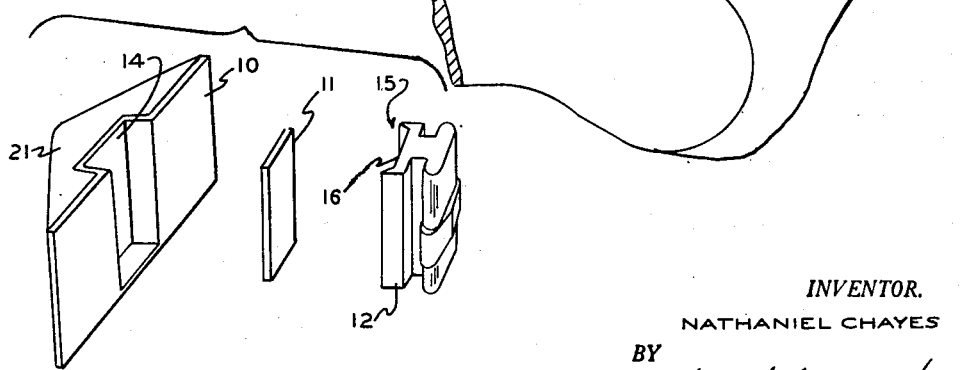
INVENTOR.
NATHANIEL CHAYES
BY
Howard T. Glandon
ATTORNEY Patented Sept. 8, 1942

2,295,201

UNITED STATES PATENT OFFICE 2,295,201

REMOVABLE DENTURE

Nathaniel Chayes, New Rochelle, N. Y.

Application February 5, 1941, Serial No. 377,432

3 Claims. (Cl. 32—5)

This invention relates to removable dentures, and more particularly to a means of uniting a precious metal saddle to a non-precious metal bridge.

In view of the fact that a great number of dental bridges are now manufactured with non-precious metals, such as the cobalt, nickel, chromium group, it has been found difficult to unite by way of casting, or soldering the precious metal attachment to the non-precious metal portion of the bridge.

An object of the invention is to provide a means of joining a low fusing precious metal attachment to a higher fusing non-precious metal saddle part of the dental bridge so that it can be effected with a minimum of expense and labor.

Another object of the invention is to provide a means of the utmost simplicity to joint a precious metal attachment to a non-precious metal saddle part of a dental bridge.

A further object of the invention is to provide a solder connection between a precious metal attachment, and a non-precious metal dental bridge.

In carrying out the objects of the invention, the gold alloy used in the production of such an attachment, has a lower fusing point than the non-precious metal saddle of the dental bridge to which it is to be attached, therefore a thin strip of platinum is so formed that a stick of solder may be retained therein, and thus permit the non-precious metal saddle to be fused to the strip of platinum, and the platinum to be soldered to the precious metal attachment.

The composite denture is similar to that already described and illustrated in the Patent # 2,078,647 which issued April 27, 1937, to John Wahlberg.

Other features, objects and advantages of the invention will become apparent by references to the following detailed description of the accompanying drawing illustrating the invention wherein:

Figure 1 is an exploded view of the parts comprising the jointure.

Figure 2 is an enlarged elevational view of a natural tooth and a portion of a bridge with the connecting parts in their proposed relationship.

Figure 3 is a cross sectional view taken on line 3—3 of Figure 2, and

Figure 4 is a view indicating the finished removable bridge with attachment in its proper occlusion.

Referring to Figure 1 the essential parts of the jointure comprise a platinum strip 10, a small piece of gold solder 11 and a precious metal attachment member 12. The platinum strip is stamped as indicated in Figure 1 having a pocket 14 formed in the center of the strip. The attachment member 12 is similar to that illustrated in the above mentioned patent with the exception that the rear portion 15 is formed to fit the pocket 14 of the strip 10 and the portion 15 has a hollow center portion 16 formed to receive the piece of solder 11. The member 12 with the piece of solder 11 retained therein fits snugly into the pocket 14 of the strip 10 and in this relationship is ready for mounting or fusing to a dental bridge 18 as indicated in Figure 2. The dental bridge 18 is of the standard removable type wherein the artificial or replacement teeth 19 are mounted on a framework 20 and the framework is formed to fit over the portion of the gum where the teeth have been removed, and a saddle portion 21 is formed to permit the special attachment member 15 to be affixed thereto. In the group of bridges where a base metal such as the chromium cobalt nickel metal is used the platinum strip 10 is joined thereto by fusing the base metal at a heat of approximately 2450°. The attachment 15 is thereafter placed in the pocket 14 with the solder 11 in the proper relationship and by heating to the low solder fusing temperature a proper fusing takes place but does not effect the already fused platinum and chromium, cobalt nickel metal. After the attachment has been properly affixed to the dental bridge 18 as illustrated and described it is fitted into the socket member which has been mounted in the inlay of a tooth as described in the above mentioned patent and as illustrated in Figure 4.

The embodiment of the invention herein disclosed is merely illustrative and may be modified and departed from in many ways without departing from the spirit and scope of the invention as pointed out in and limited solely by the appended claims.

What is claimed is:

1. A method of joining a precious metal to a non-precious metal alloy, which comprises fusing the non-precious metal alloy to the platinum at about 2450° F., fitting a precious metal member with a strip of gold solder to the platinum strip, and heating the union sufficiently to unite the platinum strip and the precious metal member with the fusion of the gold solder thereto.

2. A method of joining a precious metal saddle member to a non-precious metal alloy bridge member, which comprises fusing the non-precious metal alloy to the precious metal at about 2450 degrees Fahrenheit, fitting a precious metal member with a strip of gold solder, fitting both the said precious metal member and solder into the said saddle member, and heating the union sufficiently to unite the saddle member and the said precious metal member by fusing the gold solder thereto.

3. A method of joining a precious metal saddle member to a chromium cobalt nickel alloy bridge member, which comprises fusing the metals at about 2450 degrees Fahrenheit, fitting a precious metal member with a strip of solder, fitting both said members into the said saddle member, and heating the union sufficiently to unite the saddle member and the said precious metal member by fusing the gold solder thereto.

NATHANIEL CHAYES.